United States Patent
Chen et al.

(10) Patent No.: US 7,176,667 B2
(45) Date of Patent: Feb. 13, 2007

(54) BUCK-BOOST VOLTAGE CONVERTER

(75) Inventors: Tien-Tzu Chen, Hsinchu (TW);
Guang-Nan Tzeng, Hsinchu (TW);
Yu-Ming Tsai, Tainan County (TW)

(73) Assignee: Aimtron Technology Corp., Hsinchu (TW)

( * ) Notice: Subject to any disclaimer, the term of this patent is extended or adjusted under 35 U.S.C. 154(b) by 103 days.

(21) Appl. No.: 11/160,351

(22) Filed: Jun. 20, 2005

(65) Prior Publication Data
US 2006/0284606 A1    Dec. 21, 2006

(51) Int. Cl.
*G05F 1/10* (2006.01)

(52) U.S. Cl. ........................... 323/282; 323/283

(58) Field of Classification Search ............... 323/222, 323/224, 282, 283, 284, 285, 351
See application file for complete search history.

(56) References Cited

U.S. PATENT DOCUMENTS

| | | | |
|---|---|---|---|
| 4,439,821 A * | 3/1984 | Grippe | ........................ 363/26 |
| 5,721,483 A | 2/1998 | Kolluri et al. | |
| 5,734,258 A | 3/1998 | Esser | |
| 5,912,552 A * | 6/1999 | Tateishi | ........................ 323/285 |
| 6,037,755 A | 3/2000 | Mao et al. | |
| 6,166,527 A | 12/2000 | Dwelley et al. | |
| 6,215,286 B1 | 4/2001 | Scoones et al. | |
| 6,275,016 B1 | 8/2001 | Ivanov | |
| 6,788,033 B2 | 9/2004 | Vinciarelli | |
| 6,831,448 B2 | 12/2004 | Ishii et al. | |
| 6,912,411 B1 * | 6/2005 | Seki | ........................ 455/572 |

OTHER PUBLICATIONS

Micropower SynchronousBuck-Boost DC/DC Converter, Linear Technology Corporation. 2001, pp. 1-20, Milpitas, CA, USA.

* cited by examiner

*Primary Examiner*—Adolf Berhane
(74) *Attorney, Agent, or Firm*—Winston Hsu

(57) ABSTRACT

An input switching unit selectively couples a first terminal of an inductor with an input voltage and a ground potential. An output switching unit selectively couples a second terminal of the inductor with an output voltage and the ground potential. A first pulse generating circuit generates a first pulse signal with a first duty ratio, which is modulated in response to the output voltage. A second pulse generating circuit generates a second pulse signal with a second pulse signal with a second duty ratio, which is a constant larger than zero and smaller than one. When the first duty ratio is larger than a predetermined threshold duty ratio, a mode control circuit applies the first pulse signal to control one of the input switching unit and the output switching unit and applies the second pulse signal to control another of the input switching unit and the output switching unit.

20 Claims, 7 Drawing Sheets

$D_{MP} = 0$ — — — — — — — — — — — — — — — — —

Pure Buck Mode $D_{MP} = D_{th}$ — — — — — — — — — — — — — — — — —

Interfacial Buck Mode $D_{MP} = 1$ — — — — — — — — — — — — — — — — —

Interfacial Boost Mode $D_{MP} = D_{th}$ — — — — — — — — — — — — — — — — —

Pure Boost Mode $D_{MP} = 0$ — — — — — — — — — — — — — — — — —

FIG. 2

BUCK-BOOST VOLTAGE CONVERTER

BACKGROUND OF THE INVENTION

1. Field of the Invention

The present invention relates to a DC/DC voltage converter and, more particularly, to a buck-boost voltage converter capable of generating a regulated output voltage from an input voltage, which may be larger than, equal to, or smaller than the output voltage.

2. Description of the Related Art

DC/DC voltage converters transform an input voltage into a regulated output voltage and supply a current required by an external load at such a regulated voltage. A variety of portable electronics systems like digital cameras, disc players, laptop computers, and mobile phones employ some kind of voltage converters as a supply of controllable, regulated power. Typically, batteries are used for the input voltage by the portable electronics systems. After a long time use of the battery, the voltage provided across the battery will drop. It is possible that at the beginning the battery voltage is much higher than the output voltage to be regulated but after continuously supplying energy the battery voltage becomes almost equal to the output voltage to be regulated. If in such situation the voltage converter can still generate the regulated output voltage, the life of the battery is successfully prolonged.

If the battery keeps on duty, it should be expected that the battery voltage continues to drop and eventually becomes lower than the output voltage to be regulated. Even in this situation, if the voltage converter can still generate the regulated output voltage, the life of the battery may be prolonged to its longest possibility. Therefore, it is desired to develop a buck-boost voltage converter capable of generating a regulated output voltage from an input voltage, which may be larger than, equal to, or smaller than the output voltage.

SUMMARY OF THE INVENTION

In view of the above-mentioned problems, an object of the present invention is to provide a buck-boost voltage converter capable of generating a regulated output voltage from an input voltage, which may be larger than, equal to, or smaller than the output voltage.

According to one aspect of the present invention, a buck-boost voltage converter is provided to have a switching circuit, a first pulse generating circuit, a second pulse generating circuit, and a mode control circuit. The switching circuit has an input switching unit and an output switching unit. The input switching unit selectively couples a first terminal of an inductor to an input voltage and a ground potential. The output switching unit selectively couples a second terminal of the inductor to an output voltage and the ground potential. The first pulse generating circuit generates a first pulse signal with a first duty ratio, which is modulated in response to the output voltage. The second pulse generating circuit generates a second pulse signal with a second duty ratio, which is a constant larger than zero and smaller than one.

When the first duty ratio is smaller than a predetermined threshold duty ratio, the mode control circuit operates the switching circuit in at least one pure mode. When the first duty ratio is larger than the predetermined threshold duty ratio, the mode control circuit operates the switching circuit in at least one interfacial mode.

The at least one pure mode may have a pure buck mode and a pure boost mode. In the pure buck mode, the input switching unit is controlled by the first pulse signal, and the output switching unit is kept to consistently couple the second terminal of the inductor to the output voltage. In the pure boost mode, the output switching unit is controlled by the first pulse signal, and the input switching unit is kept to consistently couple the first terminal of the inductor to the input voltage.

The at least one interfacial mode may have an interfacial buck mode and an interfacial boost mode. In the interfacial buck mode, the input switching unit is controlled by the first pulse signal and the output switching unit is controlled by the second pulse signal. In the interfacial boost mode, the output switching unit is controlled by the first pulse signal and the input switching unit is controlled by the second pulse signal.

BRIEF DESCRIPTION OF THE DRAWINGS

The above-mentioned and other objects, features, and advantages of the present invention will become apparent with reference to the following descriptions and accompanying drawings, wherein:

FIG. 2 is a schematic diagram showing an operation of a buck-boost voltage converter according to the present invention;

DETAILED DESCRIPTION OF THE PREFERRED EMBODIMENTS

The preferred embodiments according to the present invention will be described in detail with reference to the drawings.

Figure 1:
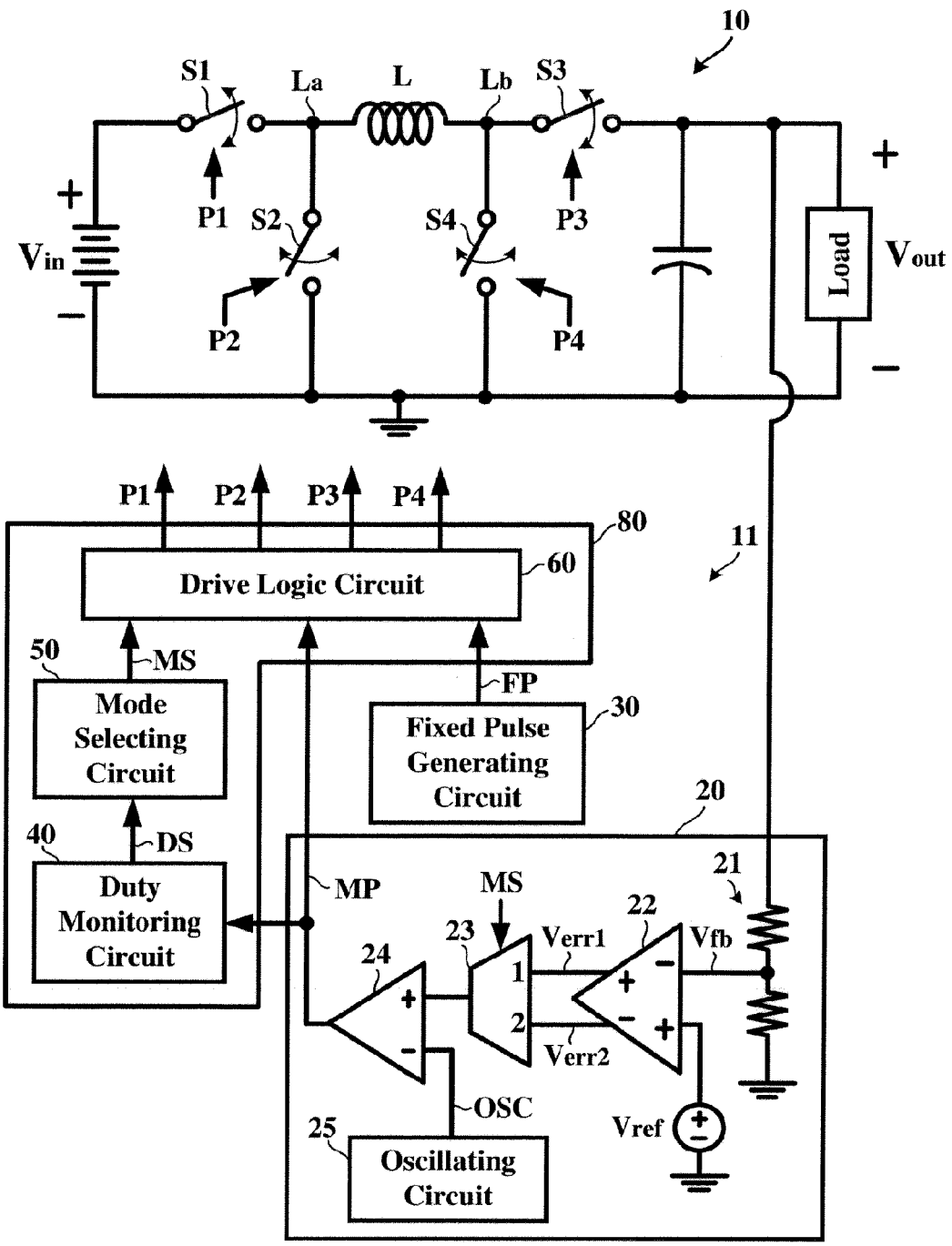
FIG. 1 is a circuit diagram showing a first example of a buck-boost voltage converter according to the present invention.

FIG. 1 is a circuit diagram showing a first example of a buck-boost voltage converter according to the present invention. The buck-boost voltage converter generates a regulated output voltage $V_{out}$ from an input voltage $V_{in}$, which may be higher than, equal to, or lower than the output voltage $V_{out}$. Referring to FIG. 1, the first example of the buck-boost voltage converter includes a synchronous switching circuit 10 and a switch control circuit 11.

The synchronous switching circuit 10 has an input switching unit and an output switching unit. More specifically, the input switching unit is configured of a first switching unit S1 and a second switching unit S2 while the output switching unit is configured of a third switching unit S3 and a fourth switching unit S4. The first switching unit S1 is interposed between the input voltage $V_{in}$ and a first terminal La of an inductor L. The second switching unit S2 is interposed between the first terminal La of the inductor L and a ground potential. The third switching unit S3 is interposed between a second terminal Lb of the inductor L and the output voltage $V_{out}$. The fourth switching unit S4 is interposed between the second terminal Lb of the inductor L and the ground potential. The switching units S1 to S4 may be implemented by an n-channel enhancement MOS transistor (NMOS), a p-channel enhancement MOS transistor (PMOS), or other controllable switches. In the following descriptions, it is assumed that each of the switching units S1 to S4 is implemented by an NMOS.

The switch control circuit 111 has a modulated pulse generating circuit 20, a fixed pulse generating circuit 30, and a mode control circuit 80. The mode control circuit 80 has a duty monitoring circuit 40, a mode selecting circuit 50, and a drive logic circuit 60. In response to the feedback of the output voltage $V_{out}$, the modulated pulse generating circuit 20 generates a modulated pulse signal MP with a duty ratio $D_{MP}$ that is modulated in accordance with a variation of the output voltage $V_{out}$. The fixed pulse generating circuit 30 generates a fixed pulse signal FP with a duty ratio $D_{FP}$ that is a constant larger than zero and smaller than one. The duty monitoring circuit 40 detects the duty ratio $D_{MP}$ of the modulated pulse signal MP and then generates a duty monitoring signal DS. In response to the duty monitoring signal DS, the mode selecting circuit 50 generates a mode selecting signal MS for controlling the drive logic circuit 60. Once an operation mode is selected in accordance with the mode selecting signal MS, the drive logic circuit 60 generates four drive signals P1 to P4 from the modulated pulse signal MP and the fixed pulse signal FP, for driving the four switching units S1 to S4 of the synchronous switching circuit 10, respectively.

FIG. 2 is a schematic diagram showing an operation of a buck-boost voltage converter according to the present invention. Referring to FIG. 2, the buck-boost voltage converter according to the present invention is selectively operated among a pure buck mode, an interfacial buck mode, an interfacial boost mode, and a pure boost mode. Assumed in a load-free circumstance, the pure buck mode and the interfacial buck mode are both applied to a condition where the input voltage $V_{in}$ is larger than the output voltage $V_{out}$, in which the interfacial buck mode is applied to an input voltage $V_{in}$ closer to the output voltage $V_{out}$. More specifically, the pure buck mode is applied to a condition that the duty ratio $D_{MP}$ of the modulated pulse signal MP is between zero and a predetermined threshold duty ratio $D_{th}$ while the interfacial buck mode is applied to a condition that the duty ratio $D_{MP}$ of the modulated pulse signal MP is between the threshold duty ratio $D_{th}$ and one. Assumed in a load-free circumstance, the pure boost mode and the interfacial boost mode are both applied to a condition where the input voltage $V_{in}$ is smaller than the output voltage $V_{out}$, in which the interfacial boost mode is applied to an input voltage $V_{in}$ closer to the output voltage $V_{out}$. More specifically, the pure boost mode is applied to a condition that the duty ratio $D_{MP}$ of the modulated pulse signal MP is between zero and the threshold duty ratio $D_{th}$ while the interfacial boost mode is applied to a condition that the duty ratio $D_{MP}$ of the modulated pulse signal MP is between the threshold duty ratio $D_{th}$ and one.

Figure 3A:
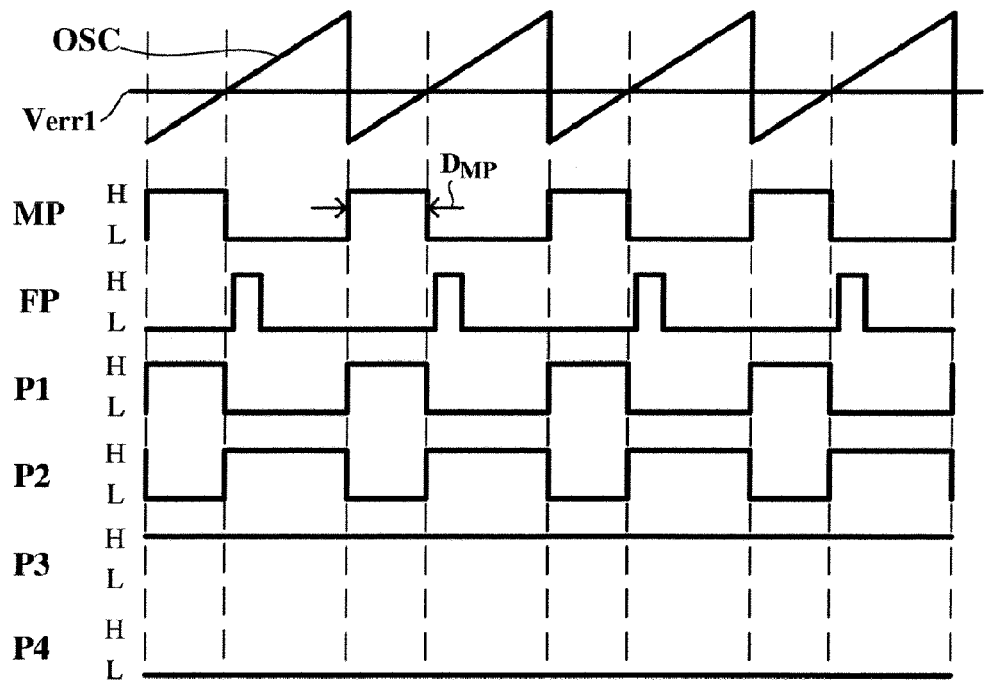
FIG. 3(A) is a timing chart showing an operation of a pure buck mode according to the present invention.

In the pure buck mode, as shown in FIG. 3(A), the first drive signal P1 is formed identical to the modulated pulse signal MP, the second drive signal P2 is formed out of phase with respect to the first drive signal P1, the third drive signal P3 is kept at a high level H, and the fourth drive signal P4 is formed out of phase with respect to the third drive signal P3 (i.e., kept at a low level L). In response to the first and second drive signals P1 and P2, the first and second switching units S1 and S2 are switched ON/OFF in such a synchronous but out-of-phase manner that the first terminal La of the inductor L is alternately coupled to the input voltage $V_{in}$ and the ground potential. However, the third switching unit S3 is kept ON and the fourth switching unit P4 is kept OFF such that the second terminal Lb of the inductor L is consistently coupled to the output voltage $V_{out}$. Therefore, the pure buck mode according to the present invention is identical to an operation of a conventional buck voltage converter and satisfies a conversion relationship of $(V_{out}/V_{in})=D_{MP}$.

Along with a drop in the input voltage $V_{in}$, the duty ratio $D_{MP}$ of the modulated pulse signal MP has to be raised in order to continuously generate the regulated output voltage $V_{out}$. When the duty ratio $D_{MP}$ exceeds a predetermined threshold duty ratio $D_{th}$, the operation of the buck-boost voltage converter according to the present invention is changed to an interfacial buck mode from the pure buck mode.

Figure 3B:
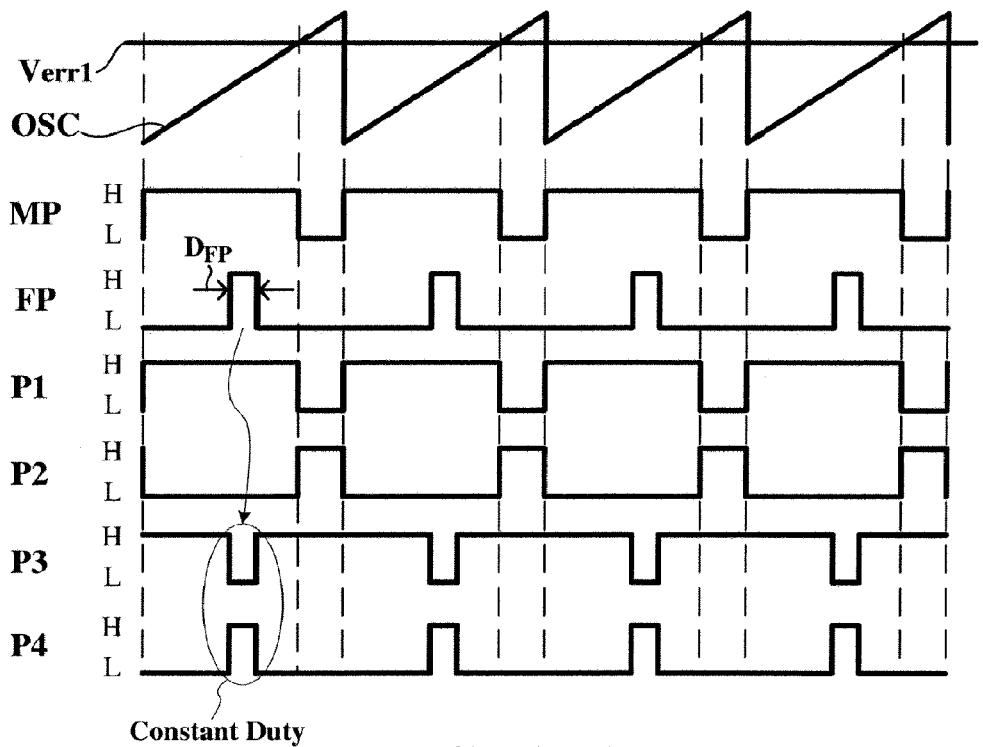
FIG. 3(B) is a timing chart showing an operation of an interfacial buck mode according to the present invention.

In the interfacial buck mode, as shown in FIG. 3(B), the first drive signal P1 is formed identical to the modulated pulse signal MP, the second drive signal P2 is formed out of phase with respect to the first drive signal P1, the third drive signal P3 is formed out of phase with respect to the fixed pulse signal FP, and the fourth drive signal P4 is formed out of phase with respect to the third drive signal P3. Therefore, the interfacial buck mode is different from the pure buck mode in that for the interfacial buck mode the third and fourth switching units S3 and S4 are switched ON/OFF in such a synchronous but out-of-phase manner that the second terminal Lb of the inductor L is alternately coupled to the output voltage $V_{out}$ and the ground potential. It should be noted that the ON/OFF switching duty of the third and fourth switching units S3 and S4 is not changed along with the output voltage $V_{out}$ because the duty ratio $D_{FP}$ of the fixed pulse signal FP is a constant.

Once the duty ratio $D_{MP}$ of the modulated pulse signal MP reaches a maximal value, i.e. one, due to the continuous drop in the input voltage $V_{in}$, the operation of the buck-boost voltage converter according to the present invention is changed to an interfacial boost mode from the interfacial buck mode.

Figure 3C:
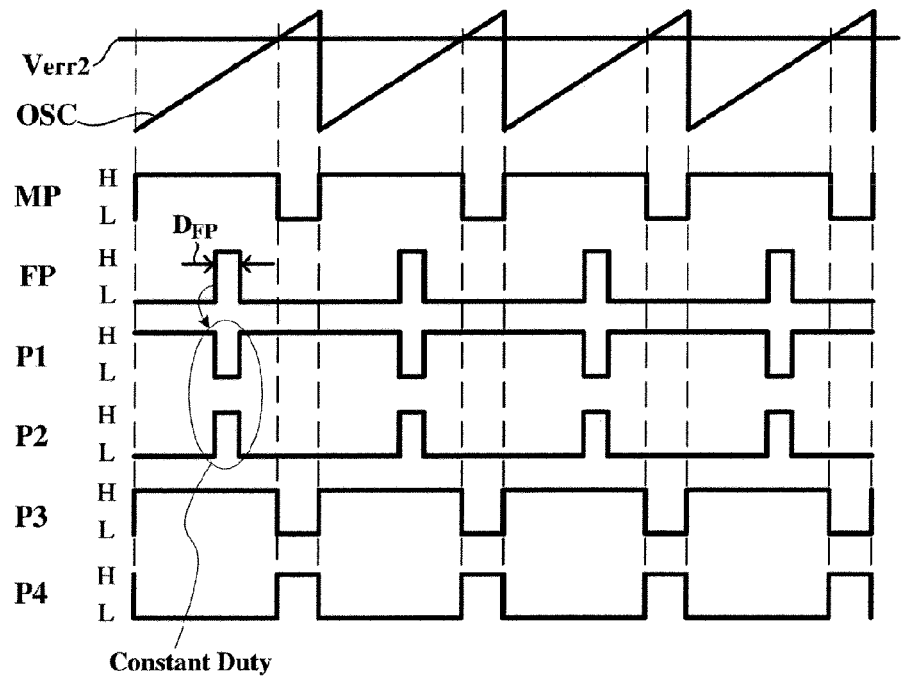
FIG. 3(C) is a timing chart showing an operation of an interfacial boost mode according to the present invention.

In the interfacial boost mode, as shown in FIG. 3(C), the first drive signal P1 is formed out of phase with respect to the fixed pulse signal FP, the second drive signal P2 is formed out of phase with respect to the first drive signal P1, the third drive signal P3 is formed identical to the modulated pulse signal MP, and the fourth drive signal P4 is formed out of phase with respect to the third drive signal P3. In response to the first and second drive signals P1 and P2, the first and second switching units S1 and S2 are switched ON/OFF in such a synchronous but out-of-phase manner that the first terminal La of the inductor L is alternately coupled to the input voltage $V_{in}$ and the ground potential. It should be noted that the ON/OFF switching duty of the first and second switching units S1 and S2 is not changed along with the output voltage $V_{out}$ because the duty ratio $D_{FP}$ of the fixed pulse signal FP is a constant. On the other hand, in response to the third and fourth drive signals P3 and P4, the third and fourth switching units S3 and S4 are switched ON/OFF in such a synchronous but out-of-phase manner that the second terminal Lb of the inductor L is alternately coupled to the output voltage $V_{out}$ and the ground potential. It should be noted that the ON/OFF switching duty of the third and fourth switching units S3 and S4 is modulated in response to the output voltage $V_{out}$.

Along with a drop in the input voltage $V_{in}$, the duty ratio $D_{MP}$ of the modulated pulse signal MP has to be reduced in order to continuously generate the regulated output voltage $V_{out}$. When the duty ratio $D_{MP}$ falls below a predetermined threshold duty ratio $D_{th}$, the operation of the buck-boost voltage converter according to the present invention is changed to a boost mode from the interfacial boost mode.

Figure 3D:
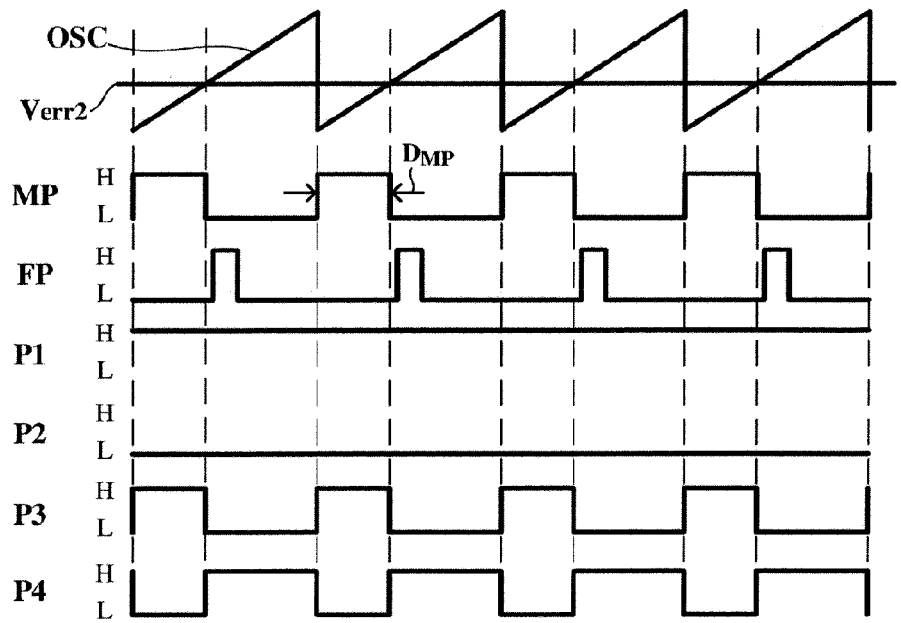
FIG. 3(D) is a timing chart showing an operation of a pure boost mode according to the present invention.

In the pure boost mode, as shown in FIG. 3(D), the first drive signal P1 is kept at a high level H, the second drive signal P2 is formed out of phase with respect to the first drive signal P1 (i.e., kept at a low level L), the third drive signal P3 is formed identical to the modulated pulse signal MP, and the fourth drive signal P4 is formed out of phase with respect to the third drive signal P3. Therefore, the pure boost mode is different from the interfacial boost mode in that the first switching unit S1 is kept ON and the second switching unit S2 is kept OFF, such that the first terminal La of the inductor L is consistently coupled to the input voltage $V_{in}$. The pure boost mode according to the present invention is identical to an operation of a conventional boost voltage converter and satisfies a conversion relationship of $(V_{out}/V_{in})=1/(1-D_{MP})$.

In the situation where the duty ratio $D_{MP}$ is close to the threshold duty ratio $D_{th}$, in order to prevent undesired back-and-forth transitions between the pure and interfacial modes triggered by noise or a sight fluctuation, the threshold duty ratio $D_{th}$ may be provided with a hysteresis. More specifically, the threshold duty ratio $D_{th}$ has a relatively higher value $D_{th(H)}$ such as 0.95, and a relatively lower value $D_{th(L)}$ such as 0.85. The duty ratio $D_{MP}$ of the modulated pulse signal MP needs to exceed the relatively higher threshold duty ratio $D_{th(H)}$ to trigger a transition from the pure modes to the interfacial modes. However, in the opposite direction, the duty ratio $D_{MP}$ of the modulated pulse signal MP needs to fall below the relatively lower threshold duty ratio $D_{th(L)}$ to trigger a transition from the interfacial modes to the pure modes.

Referring back to FIG. 1, the circuitry and operation of the modulated pulse generating circuit 20 are described in detail hereinafter. The modulated pulse generating circuit 20 has a voltage feedback circuit 21, an error amplifying circuit 22, a transmission control circuit 23, a comparing circuit 24, and an oscillating circuit 25.

The voltage feedback circuit 21 is coupled to the output terminal of the synchronous switching circuit 10 for generating a voltage feedback signal $V_{fb}$ representative of the output voltage $V_{out}$. For example, the voltage feedback circuit 21 may be implemented by a voltage divider consisting of a plurality of series-connected resistors.

The error amplifying circuit 22 has an inverting input terminal (−) and a non-inverting input terminal (+). The inverting input terminal receives the voltage feedback signal $V_{fb}$ while the non-inverting input terminal receives a predetermined reference voltage $V_{ref}$. Based on the comparison between the voltage feedback signal $V_{fb}$ and the reference voltage $V_{ref}$, the error amplifying circuit 22 generates a first error signal $V_{err1}$ from a non-inverting output terminal (+) and a second error signal $V_{err2}$ from an inverting output terminal (−). The first error signal $V_{err1}$ and the second error signal $V_{err2}$ varies in the opposite directions. In other words, when the voltage feedback signal $V_{fb}$ increases, the first error signal $V_{err1}$ decreases but the second error signal $V_{err2}$ increases.

The transmission control circuit 23 is interposed between the error amplifying circuit 22 and the comparing circuit 24, for selectively allowing, in accordance with the mode selecting signal MS of the mode selecting circuit 50, the first error signal $V_{err1}$ or the second error signal $V_{err2}$ to be applied to the comparing circuit 24. In each of the pure buck mode and the interfacial buck mode, the transmission control circuit 23 allows the first error signal $V_{err1}$ to be applied to the comparing circuit 24. In each of the pure boost mode and the interfacial boost mode, the transmission control circuit 23 allows the second error signal $V_{err2}$ to be applied to the comparing circuit 24. Further descriptions about the transmission control circuit 23 are omitted since it may be implemented by controllable transmission gates that are well known in the art.

The comparing circuit 24 has a non-inverting input terminal (+) and an inverting input terminal (−). The non-inverting input terminal receives the first or second error signals $V_{err1}$ or $V_{err2}$ while the inverting input terminal receives the oscillating signal OSC generated from the oscillating circuit 25. Based on the comparison between the first or second error signals $V_{err1}$ or $V_{err2}$ and the oscillating signal OSC, the comparing circuit 24 generates a modulated pulse signal MP with a modulated duty ratio $D_{MP}$. As shown in FIGS. 3(A) and 3(B), in the pure buck mode and the interfacial buck mode, the modulated pulse signal MP is determined by the first error signal $V_{err1}$ and the oscillating signal OSC. When the voltage feedback signal $V_{fb}$ representative of the output voltage $V_{out}$ increases, as mentioned earlier, the first error signal $V_{err1}$ decreases to make the duty ratio $D_{MP}$ of the modulated pulse signal MP smaller so as to suppress the output voltage $V_{out}$. As shown in FIGS. 3(C) and 3(D), in the pure boost mode and the interfacial boost mode, the modulated pulse signal MP is determined by the second error signal $V_{err2}$ and the oscillating signal OSC. When the voltage feedback signal $V_{fb}$ representative of the output voltage $V_{out}$ increases, the second error signal $V_{err1}$ increases, as mentioned earlier, to make the duty ratio $D_{MP}$ of the modulated pulse signal MP larger so as to suppress the output voltage $V_{out}$.

Figure 4:
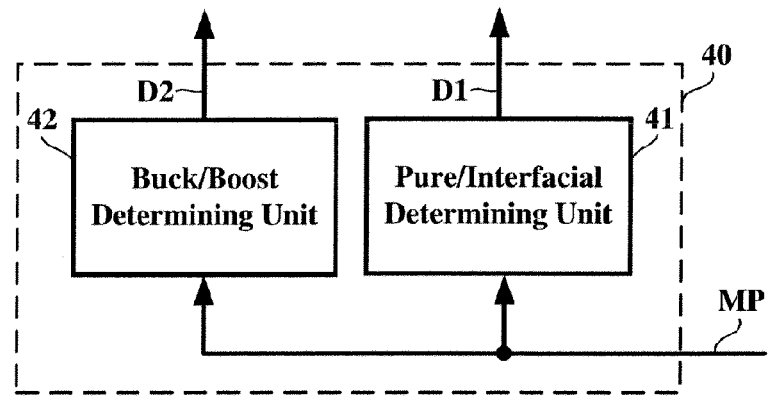
FIG. 4 is a circuit diagram showing a duty monitoring circuit according to the present invention.

Referring to FIG. 4, the duty monitoring circuit 40 has a pure/interfacial determining unit 41 and a buck/boost determining unit 42. The pure/interfacial determining unit 41 makes a determination on whether the duty ratio $D_{MP}$ of the modulated pulse signal MP is smaller than the threshold duty ratio $D_{th}$. A first determining signal D1 is output at a high level H when the duty ratio $D_{MP}$ is smaller than the threshold duty ratio $D_{th}$, and at a low level L when the duty ratio $D_{MP}$ is larger than the threshold duty ratio $D_{th}$. The buck/boost determining unit 42 makes a determination on whether the duty ratio $D_{MP}$ of the modulated pulse signal MP is larger than one. A second determining signal D2 is output at a low level L when the duty ratio $D_{MP}$ is smaller than one, and at a high level H when the duty ratio $D_{MP}$ is larger than one. In one embodiment, the duty monitoring signal DS of the duty monitoring circuit 40 consists of the first and second determining signals D1 and D2.

Figure 5:
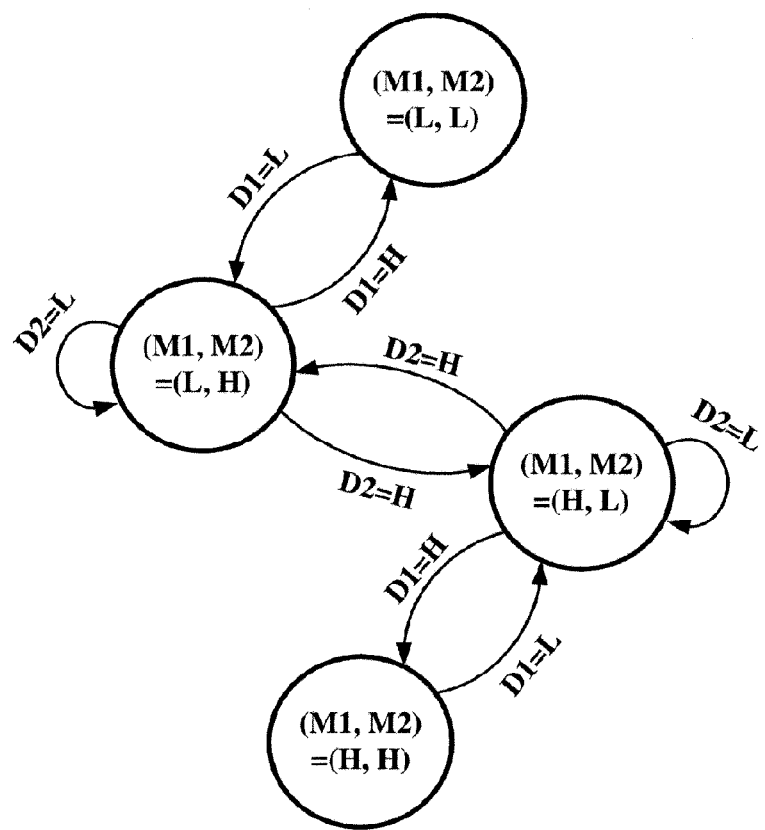
FIG. 5 is a state diagram showing a mode selecting circuit according to the present invention.

Referring to FIG. 5, the mode selecting circuit 50 may be implemented by a finite state machine. The mode selecting signal MS may be a combination of a first selecting signal M1 and a second selecting signal M2, which are binary signals having a high level H and a low level L. As a result, the mode selecting signal MS has four possible states for commanding the four operation modes shown in FIG. 2, respectively. More specifically, the state (M1, M2)=(L, L) selects and commands the pure buck mode, the state (M1, M2)=(L, H) selects and commands the interfacial buck mode, the state (M1, M2)=(H, L) selects and commands the interfacial boost mode, and the state (M1, M2)=(H, H) selects and commands the pure boost mode. Also shown in FIG. 5 is the way the mode selecting circuit 50 makes transitions among the four states in response to the first and second determining signals D1 and D2 from the duty monitoring circuit 40.

Figure 6:
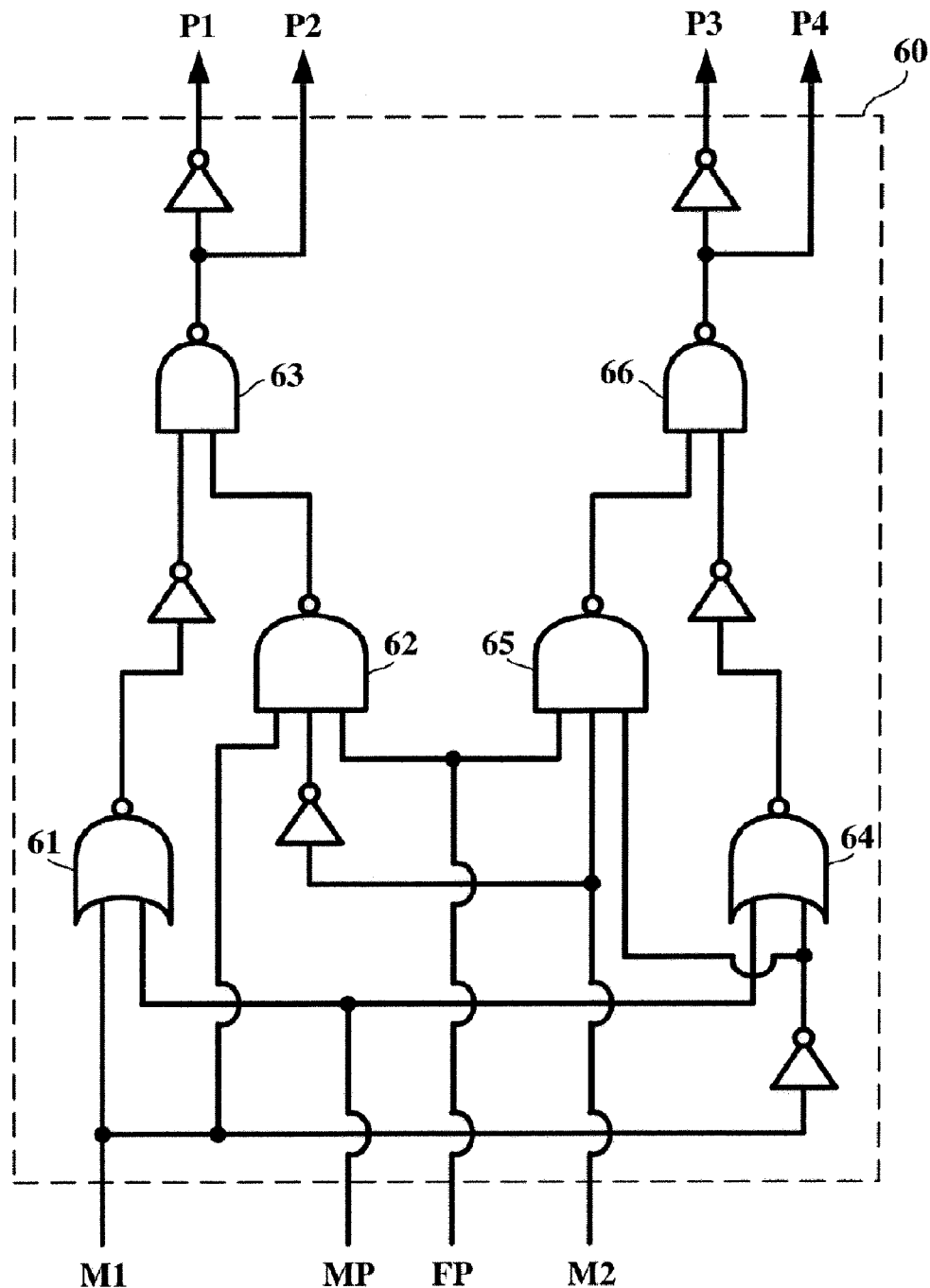
FIG. 6 is a detailed circuit diagram showing a drive logic circuit according to the present invention.

Referring to FIG. 6, once the operation mode is selected in accordance with the mode selecting signal MS, the drive logic circuit 60 generates four drive signals P1 to P4 from the modulated pulse signal MP and the fixed pulse signal FP. When the mode selecting signal MS is at the state (M1, M2)=(L, L), the logic gate 62 blocks the fixed pulse signal FP from being applied to the logic gate 63. As a result, the first and second drive signals P1 and P2 are generated in accordance with the modulated pulse signal MP through the logic gates 61 and 63. On the other hand, the logic gate 64 blocks the modulated pulse signal MP from being applied to the logic gate 66, and the logic gate 65 blocks the fixed pulse signal FP from being applied to the logic 66. As a result, the third drive signal P3 is kept at the high level H and the fourth drive signal P4 is kept at the low level L. Therefore, the state (M1, M2)=(L, L) effectively produces the pure buck mode shown in FIG. 3(A). When the mode selecting signal MS is changed to the state (M1, M2)=(L, H), the third and fourth drive signals P3 and P4 are generated in accordance with the fixed pulse signal FP through the logic gates 65 and 66. Therefore, the state (M1, M2)=(L, H) effectively produces the interfacial buck mode shown in FIG. 3(B).

When the mode selecting signal MS is at the state (M1, M2)=(H, H), the logic gate 65 blocks the fixed pulse signal FP from being applied to the logic gate 66. As a result, the third and fourth drive signals P3 and P4 are generated in accordance with the modulated pulse signal MP through the logic gates 64 and 66. On the other hand, the logic gate 61 blocks the modulated pulse signal MP from being applied to the logic gate 63, and the logic gate 62 blocks the fixed pulse signal FP from being applied to the logic gate 63. As a result, the first drive signal P1 is kept at the high level H and the second drive signal P2 is kept at the low level L. Therefore, the state (M1, M2)=(H, H) effectively produces the pure boost mode shown in FIG. 3(D). When the mode selecting signal MS is changed to the state (M1, M2)=(H, L), the first and second drive signals P1 and P2 are generated in accordance with the fixed pulse signal FP through the logic gates 62 and 63. Therefore, the state (M1, M2)=(L, H) effectively produces the interfacial boost mode shown in FIG. 3(C).

Figure 7A:
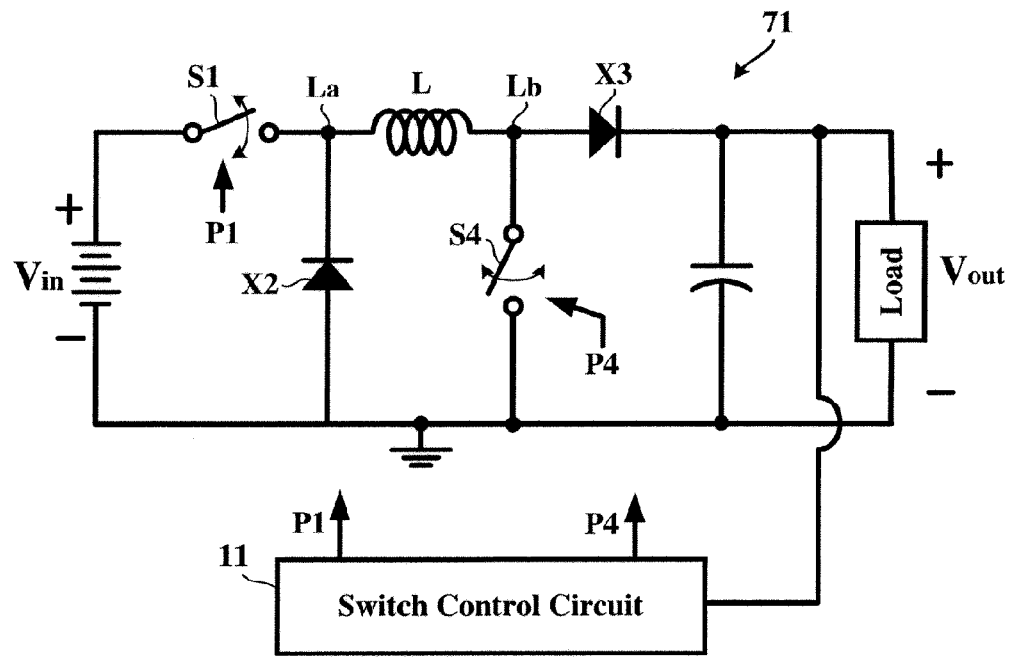
FIG. 7(A) is a circuit diagram showing a second example of a buck-boost voltage converter according to the present invention.

FIG. 7(A) is a circuit diagram showing a second example of a buck-boost voltage converter according to the present invention. The second example is different from the first example in that a switching circuit 71 of the second example is configured of a non-synchronous input switching unit and a non-synchronous output switching unit. More specifically, the second switching unit S2 of the input switching unit is replaced by a diode X2 while the third switching unit S3 of the output switching unit is replaced by a diode X3. The switch control circuit 11 shown in FIG. 1 is also applicable to the non-synchronous switching circuit 71 of the second example. Since the diodes X2 and X3 are passive switches, the switch control circuit 11 is required only to provide the first and fourth drive signals P1 and P4 for controlling the first and fourth switching units S1 and S4, respectively.

Figure 7B:
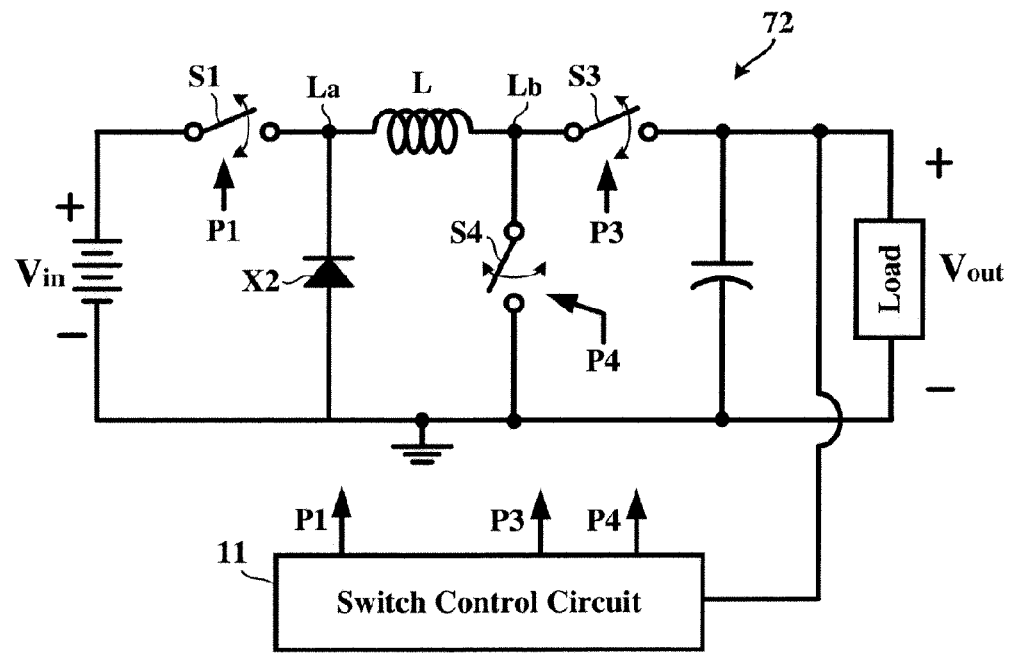
FIG. 7(B) is a circuit diagram showing a third example of a buck-boost voltage converter according to the present invention.

FIG. 7(B) is a circuit diagram showing a third example of a buck-boost voltage converter according to the present invention. The third example is different from the second example in that a switching circuit 72 of the third example is configured of a non-synchronous input switching unit and a synchronous output switching unit. More specifically, the second switching unit S2 of the input switching unit is replaced by a diode X2. The switch control circuit 11 shown in FIG. 1 is also applicable to the non-synchronous switching circuit 72 of the third example. Since the diodes X2 is a passive switch, the switch control circuit 11 is required only to provide the first, third, and fourth drive signals P1, P3, and P4 for controlling the first, third, and fourth switching units S1, S3, and S4, respectively. It should be noted that the switch control circuit 11 according to the present invention is also applicable to a non-synchronous switching circuit where the third switching unit S3 of the output switching unit is replaced by a diode X3.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A buck-boost voltage converter comprising:
 a switching circuit having an input switching unit for selectively coupling a first terminal of an inductor to an input voltage and a ground potential, and an output switching unit for selectively coupling a second terminal of the inductor to an output voltage and the ground potential;
 a first pulse generating circuit for generating a first pulse signal with a first duty ratio, which is modulated in response to the output voltage;
 a second pulse generating circuit for generating a second pulse signal with a second duty ratio, which is a constant larger than zero and smaller than one; and
 a mode control circuit for operating the switching circuit in:
  at least one pure mode such that one of the input switching unit and the output switching unit is controlled by the first pulse signal, and another of the input switching unit and the output switching unit is kept at a consistent coupling state, and
  at least one interfacial mode such that one of the input switching unit and the output switching unit is controlled by the first pulse signal, and another of the input switching unit and the output switching unit is controlled by the second pulse signal.

2. The buck-boost voltage converter according to claim 1, wherein:
 when the first duty ratio is smaller than a predetermined threshold duty ratio, the mode control circuit operates the switching circuit in the at least one pure mode.

3. The buck-boost voltage converter according to claim 1, wherein:
 when the first duty ratio is larger than a predetermined threshold duty ratio, the mode control circuit operates the switching circuit in the at least one interfacial mode.

4. The buck-boost voltage converter according to claim 1, wherein:
 the at least one pure mode has:
  a pure buck mode such that the input switching unit is controlled by the first pulse signal and the output switching unit is kept to consistently couple the second terminal of the inductor to the output voltage, and a pure boost mode such that the output switching unit is controlled by the first pulse signal and the input switching unit is kept to consistently couple the first terminal of the inductor to the input voltage.

5. The buck-boost voltage converter according to claim 1, wherein:
the at least one interfacial mode has:
an interfacial buck mode such that the input switching unit is controlled by the first pulse signal and the output switching unit is controlled by the second pulse signal, and
an interfacial boost mode such that the output switching unit is controlled by the first pulse signal and the input switching unit is controlled by the second pulse signal.

6. The buck-boost voltage converter according to claim 1, wherein:
the input switching unit has:
a first switching unit interposed between the input voltage and the first terminal of the inductor, and
a second switching unit interposed between the ground potential and the first terminal of the inductor.

7. The buck-boost voltage converter according to claim 1, wherein:
the input switching unit has:
a first switching unit interposed between the input voltage and the first terminal of the inductor, and
a diode interposed between the ground potential and the first terminal of the inductor.

8. The buck-boost voltage converter according to claim 1, wherein:
the output switching unit has:
a third switching unit interposed between the second terminal of the inductor and the output voltage, and
a fourth switching unit interposed between the second terminal of the inductor and the ground potential.

9. The buck-boost voltage converter according to claim 1, wherein:
the output switching unit has:
a diode interposed between the second terminal of the inductor and the output voltage, and
a fourth switching unit interposed between the second terminal of the inductor and the ground potential.

10. The buck-boost voltage converter according to claim 1, wherein:
the first pulse generating circuit has:
a feedback circuit for generating a feedback signal representative of the output voltage;
an error amplifying circuit for generating a first error signal and a second error signal in accordance with the feedback signal and a predetermined reference voltage;
a transmission control circuit for selectively allowing the first error signal and the second error signal to pass through;
an oscillating circuit for generating an oscillating signal; and
a comparing circuit for generating the first pulse signal, in which when the transmission control circuit allows the first error signal to pass through, the first pulse signal is generated by comparing the first error signal and the oscillating signal, and when the transmission control circuit allows the second error signal to pass through, the first pulse signal is generated by comparing the second error signal and the oscillating signal.

11. The buck-boost voltage converter according to claim 10, wherein:
the first error signal decreases but the second error signal increases in response to an increase of the feedback signal.

12. The buck-boost voltage converter according to claim 1, wherein:
the mode control circuit has:
a duty monitoring circuit for monitoring the first duty ratio of the first pulse signal;
a mode selecting circuit for generating a mode selecting signal in response to the duty monitoring circuit; and
a drive logic circuit for applying the first pulse signal and the second pulse signal to the switching circuit base on the mode selecting signal.

13. The buck-boost voltage converter according to claim 1, wherein:
the duty monitoring circuit has:
a first determining unit for generating a first determining signal indicative of whether the first duty ratio is larger than a predetermined threshold duty ratio, and
a second determining unit for generating a second determining signal indicative of whether the first duty ratio is larger than one.

14. The buck-boost voltage converter according to claim 1, wherein:
the mode selecting circuit is implemented by a finite state machine that changes states in response to the duty monitoring circuit.

15. A buck-boost voltage converter comprising:
a switching circuit having an input switching unit for selectively coupling a first terminal of an inductor to an input voltage and a ground potential, and an output switching unit for selectively coupling a second terminal of the inductor to an output voltage and the ground potential;
a first pulse generating circuit for generating a first pulse signal with a first duty ratio, which is modulated in response to the output voltage;
a second pulse generating circuit for generating a second pulse signal with a second duty ratio, which is a constant larger than zero and smaller than one; and
a mode control circuit for causing one of the input switching unit and the output switching unit to be controlled by the first pulse signal and another of the input switching unit and the output switching unit to be controlled by the second pulse signal when the first duty ratio is larger than a predetermined threshold duty ratio.

16. The buck-boost voltage converter according to claim 15, wherein:
when the first duty ratio is smaller than a predetermined threshold duty ratio, the mode control circuit causes one of the input switching circuit and the output switching unit to be controlled by the first pulse signal and keeps another of the input switching circuit and the output switching circuit at a consistent coupling state.

17. The buck-boost voltage converter according to claim 16, wherein:
in the situation that the first duty ratio is smaller than the predetermined threshold duty ratio, when the input switching unit is controlled by the first pulse signal, the output switching unit is kept to consistently couple the second terminal of the inductor to the output voltage, and when the output switching unit is controlled by the first pulse signal, the input switching unit is kept to consistently couple the first terminal of the inductor to the input voltage.

18. A method of converting a voltage, applied to a switching circuit having an input switching unit for selectively coupling a first terminal of an inductor to an input voltage and a ground potential, and an output switching unit for selectively coupling a second terminal of the inductor to an output voltage and the ground potential, the method comprising:

generating a first pulse signal with a first duty ratio, which is modulated in response to the output voltage;

generating a second pulse signal with a second duty ratio, which is a constant larger than zero and smaller than one;

monitoring the first duty ratio of the first pulse signal; and controlling one of the input switching unit and the output switching unit by the first pulse signal and controlling another of the input switching unit and the output switching unit by the second pulse signal when the first duty ratio is larger than a predetermined threshold duty ratio.

19. The method according to claim 18, further comprising:

controlling one of the input switching unit and the output switching unit by the first pulse signal and keeping another of the input switching unit and the output switching unit at a consistent coupling state when the first duty ratio is smaller than the predetermined threshold duty ratio.

20. The method according to claim 19, wherein:

in the step that the first duty ratio is smaller than the predetermined threshold duty ratio, when the input switching unit is controlled by the first pulse signal, the output switching unit is kept to consistently couple the second terminal of the inductor to the output voltage, and when the output switching unit is controlled by the first pulse signal, the input switching unit is kept to consistently couple the first terminal of the inductor to the input voltage.

* * * * *